United States Patent [19]
Fruhauf et al.

[11] Patent Number: 5,304,861
[45] Date of Patent: Apr. 19, 1994

[54] CIRCUIT FOR THE DETECTION OF TEMPERATURE THRESHOLD, LIGHT AND UNDULY LOW CLOCK FREQUENCY

[75] Inventors: Serge Fruhauf, Peynier; Michel Martin, Marseille, both of France

[73] Assignee: SGS-Thomson Microelectronics S.A., Gentilly, France

[21] Appl. No.: 838,301
[22] PCT Filed: Sep. 12, 1990
[86] PCT No.: PCT/FR90/C0655
  § 371 Date: May 5, 1992
  § 102(e) Date: May 5, 1992
[87] PCT Pub. No.: WO91/04473
  PCT Pub. Date: Apr. 4, 1991

[30] Foreign Application Priority Data
  Sep. 12, 1989 [FR] France .................. 89 11881

[51] Int. Cl.$^5$ .................. H03K 3/26; G11C 11/00
[52] U.S. Cl. .................. 307/296.4; 307/310; 323/231; 323/317
[58] Field of Search ............ 307/320, 310, 311, 296.4, 307/571, 522, 524; 323/231, 229, 303, 315, 317, 316; 374/173, 178

[56] References Cited
U.S. PATENT DOCUMENTS

| | | | |
|---|---|---|---|
| 3,560,755 | 2/1971 | Massy .................. | 307/311 |
| 3,770,968 | 11/1973 | Hession et al. .................. | 307/311 |
| 4,217,535 | 8/1980 | Suzuki et al. .................. | 323/317 |
| 4,390,829 | 6/1983 | Jarrett .................. | 323/231 |
| 4,450,367 | 5/1984 | Whatley .................. | 323/315 |
| 4,686,449 | 8/1987 | Jeffrey et al. .................. | 323/231 |
| 4,952,796 | 8/1990 | Fruhauf et al. .................. | 307/311 |
| 4,999,567 | 3/1991 | Morigami .................. | 323/315 |
| 5,013,904 | 5/1991 | Muro .................. | 307/311 |
| 5,059,890 | 10/1991 | Yoshikawa et al. .................. | 323/315 |
| 5,070,322 | 12/1991 | Fujihira .................. | 307/310 |
| 5,180,966 | 1/1993 | Sugawara et al. .................. | 323/315 |

FOREIGN PATENT DOCUMENTS

| | | | |
|---|---|---|---|
| 0240807 | 10/1987 | European Pat. Off. . | |
| 0306396 | 3/1989 | European Pat. Off. . | |
| 2941285 | 6/1980 | Fed. Rep. of Germany . | |
| 0132816 | 8/1983 | Japan .................. | 323/231 |
| 0892440 | 12/1981 | U.S.S.R. .................. | 323/231 |
| 2070820 | 9/1981 | United Kingdom . | |
| 2071955 | 9/1981 | United Kingdom . | |

*Primary Examiner*—William L. Sikes
*Assistant Examiner*—Toan Tran
*Attorney, Agent, or Firm*—Paul W. O'Malley

[57] ABSTRACT

A detection circuit that does not vary with the supply voltage is formed by measuring the voltage generated at the terminals of a diode (1) which is reverse biased and is supplied by a constant current generator (2). Furthermore, the generator (2) is improved by a current consumption limitation circuit (5). This circuit is particularly designed to be implanted in CMOS technology on the same substrate as a memory circuit or a microprocessor circuit.

14 Claims, 3 Drawing Sheets

CIRCUIT FOR THE DETECTION OF TEMPERATURE THRESHOLD, LIGHT AND UNDULY LOW CLOCK FREQUENCY

An object of the present invention is a circuit for the detection of temperature threshold, light and unduly low clock frequency, that can be used in all the fields where such checks have to be conducted. The invention can be used especially in the field of integrated circuits and in the field of circuits for chip cards or memory cards.

It is known that the temperature of electronic integrated circuits, such as chip cards, memory cards or other programmable circuits, increases during their operation and, especially, during their programming. Two temperature thresholds are observed, a first threshold beyond which the circuit no longer works normally but returns to its normal operation if its temperature falls back below this threshold, and a second one for which there is a breakdown of the integrated circuit.

It is thus seen that if the rate of programming is excessively high, the temperature of the circuit will increase greatly, prompting either an erroneous programming or, at worst, the destruction of the circuit. It may be pointed out that fraudulent individuals could be tempted to raise the temperature of the integrated circuit to a temperature above the operating limit, causing either false programming or a modification of the memory content.

A circuit for the detection of the first temperature threshold gives a binary signal that can be used, for example, for the checking of access to the circuit: it is then possible to prohibit the operation of the circuit for a temperature above this first temperature threshold.

There are known temperature detectors based on integrated circuits that comprise chiefly a forward-biased MOS transistor and have a conduction threshold known to vary with the temperature by about 2 mv/° C. This detector is not very sensitive since a high variation in temperature prompts only a small variation in voltage. Moreover, it is not very reliable since it is known that the threshold voltage cannot be reproduced with precision from one integrated circuit to another, owing to differences in concentration of impurities.

There are other known detectors that essentially use a MOS transistor reverse biased by an electrical supply, the current of which is known to vary substantially with the temperature: for example, the current may increase twofold for an increase of about ten degrees in temperature, rector such as this is described, for example, in French application No. 87 12070 filed on 31 Aug. 31, 1987.

However, in a detector such as this, the current depends on the level of the supply voltage. Now, this level varies typically between 4.5 and 5.5 volts for a nominal level of 5 volts: this is an intrinsic feature of the supply circuits used. Furthermore external disturbances, notably those applied by fraudulent individuals, may also cause variations in the level of the supply.

The variation in current induced by the variation in the level of the supply voltage will prompt the triggering of the detector for a voltage below or above the threshold voltage of the circuit to be detected. In the former case, there is a false alarm that only hampers the use of the circuit, for example in slowing down the access time. In the latter case, the use of the circuit is authorized beyond its threshold temperature: the detector no longer fulfils its function. It can therefore not be used as such.

The invention overcomes this drawback by proposing the implementation of another known physical phenomenon. It is known that the current in a reverse-biased diode increases significantly with the temperature: the current typically doubles every 10° C. for silicon. It is shown that, from a certain temperature onwards, the increase becomes greater. The current due to the minority carriers (reverse current of saturation) which, until then, has been predominant, becomes smaller than the current due to the majority carriers (diffusion current). Moreover, the temperature thus defined is in fact the temperature from which the circuit into which the diode is integrated begins to stop working normally: this temperature is the temperature threshold Ts of the integrated circuit.

At this threshold temperature Ts, the reverse-biased diode conducts a current Is.

FIG. 1 is a graph $\log_{10} I = f(1000/T)$, where I is the current of the reverse-biased diode and T the temperature in degrees Kelvin of the integrated circuit. The corresponding curve is known for a given diode, namely for a given junction area and a given concentration of impurities. For T smaller than or equal to Ts, there is a first half line and for T greater than or equal to Ts, there is a second half line with a slope double that of the first one. For T greater than or equal to Ts, the current increases far more speedily with the temperature than for T smaller than or equal to Ts.

The physical phenomenon described is used to make a temperature detector. Indeed, if the reverse-biased diode is supplied with a given current I, it is the voltage Vd at the terminals of the diode that will vary with the temperature: if the temperature rises, the voltage Vd diminishes and, beyond the threshold temperature, it even falls very swiftly below a voltage $V_{threshold}$ (FIG. 2). If the current I is equal to the current Is defined further-above, a voltage detection circuit which has a triggering voltage equal to $V_{threshold}$ and which is placed at the terminals of the diode gets triggered as soon as the temperature Ts is reached in the circuit (FIG. 2): a temperature detector is made. This detector is very sensitive for, beyond the threshold temperature, the voltage Vd very soon becomes very small.

Since the generator that normally supplies the diode comprises a transistor having its source or its drain connected to the positive supply voltage Vcc, the current in the diode varies with the variations in supply voltage. It is seen, for example, in FIG. 2, that if the current Is increases, the detector will be triggered at a temperature T' > Ts: a standard assembly such as this is therefore unsuitable.

In the invention, this physical phenomenon is used all the same, but in this case with a current supply circuit, the value of the current of which is independent of the supply voltage.

The invention comprises a detection circuit comprising a diode that is reverse biased by a supply voltage, characterized in that the diode is supplied with constant current by a generator of constant current that is independent of the variations of the supply voltage.

The invention will be understood more clearly from the reading of the following description and from the figures that accompany it. This description, which is made with reference to the figures, is given only by way of indication and in no way restricts the scope of the invention. In these figures.

Figure 1:
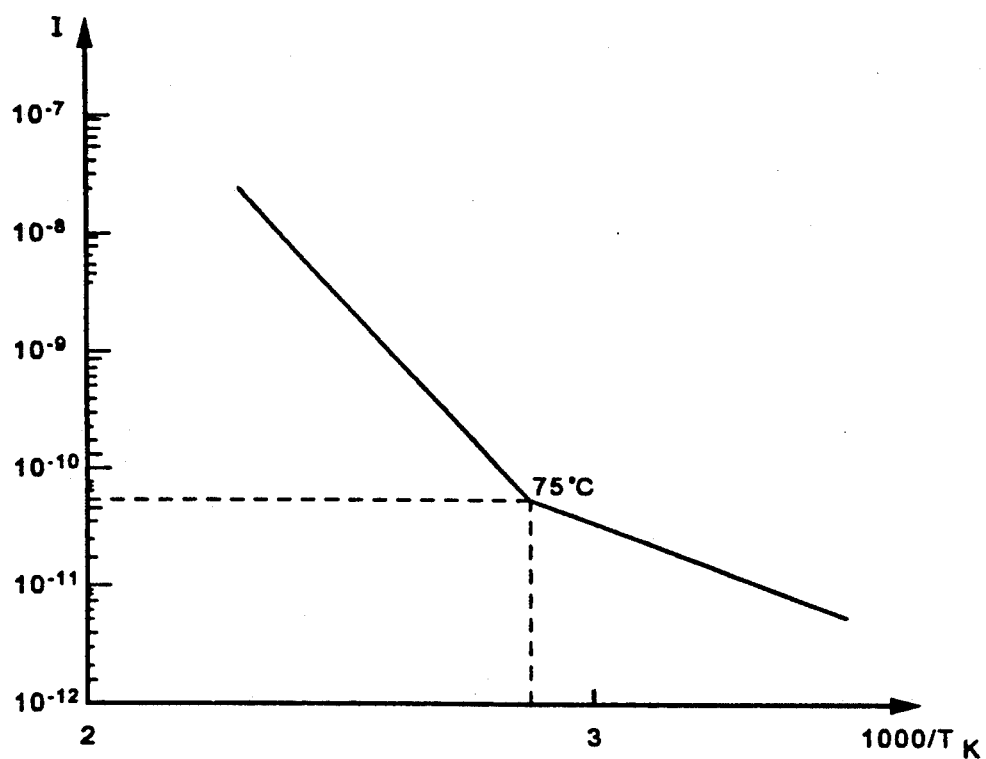
FIG. 1 is a graph already commented upon showing the characteristic curve $\log_{10} I = f(1000/T)$ of a reverse-biased diode.
Figure 2:
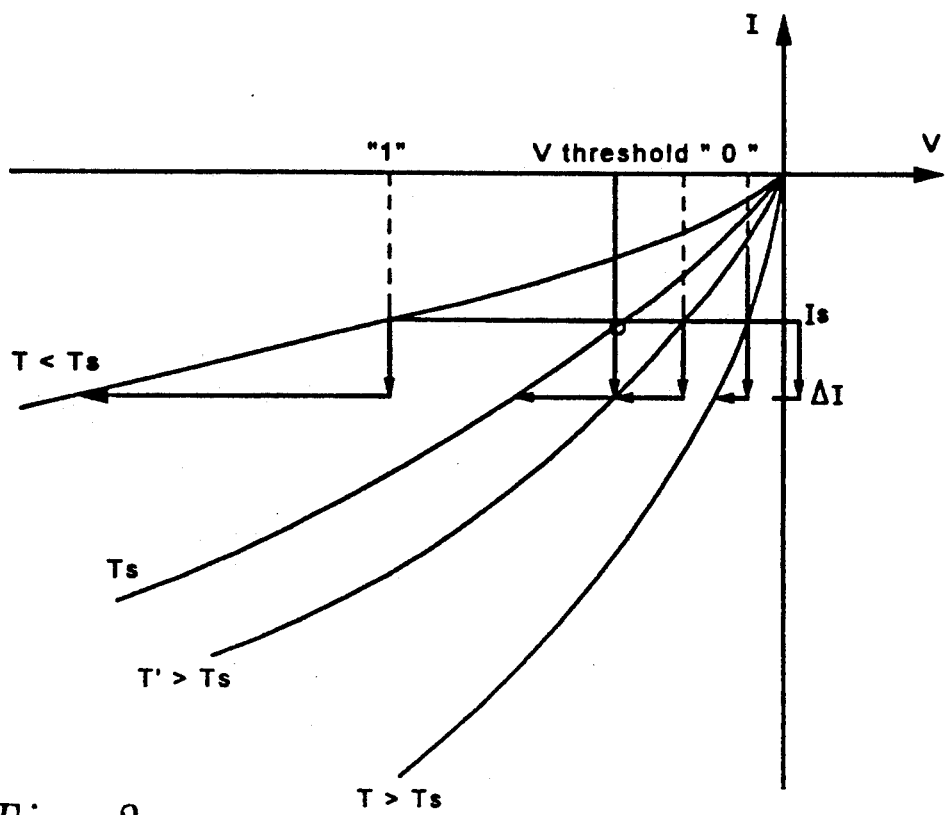
FIG. 2 is a graph already commented upon that can be used to describe the principle of detection of the threshold temperature according to the invention.

FIGS. 1 and 2 describe the physical phenomenon and the principle of detection of a temperature threshold detection circuit according to the invention. These figures have been explained here above.

Figure 5:
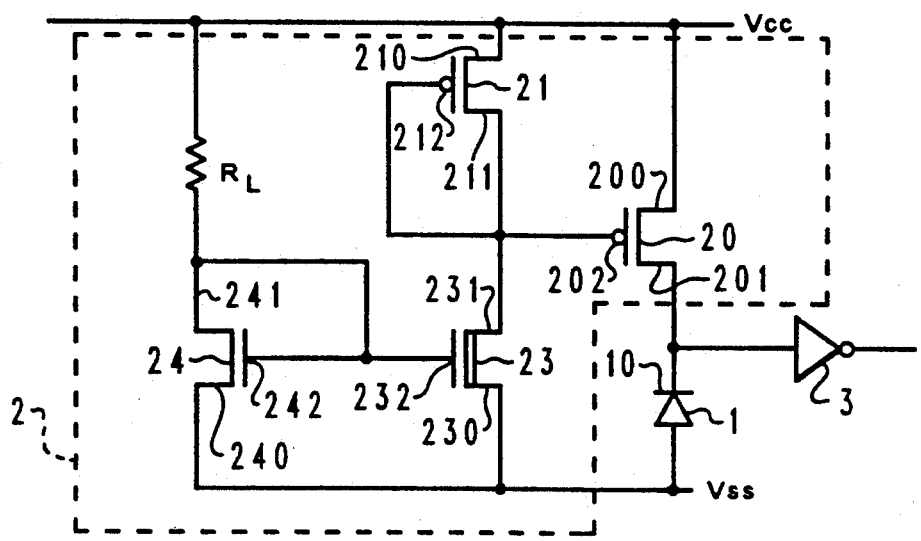
FIG. 5 is a circuit schematic of a temperature threshold detector in accordance with one embodiment of the invention.

FIG. 5 is an electrical diagram of a detection circuit according to the invention. This diagram shows a reverse-biased diode I and a generator 2 of a constant current that is independent of the variations of the supply voltage Vcc. This current source 2 is placed between the supply voltage Vcc and the cathode 10 of the diode. It delivers a current that is equal to the current Is of the diode, in accordance with the already explained principle of detection.

At the point of connection of the diode with the generator, there is faced a detection amplifier 3 represented in FIG. 5 by a simple logic inverter. This is only one exemplary embodiment of an amplifier. Other known embodiments are possible. At output, this amplifier delivers a binary signal which, for example, is equal to "1" when, in terms of absolute value, the value of the voltage at the terminals of the diode is greater than the value of the threshold voltage and "0" when it is below this threshold (FIG. 2). The binary signal is used, for example, to bar any access to the integrated circuit immediately upon detection of the fact that the voltage at the terminals of the diode has gone below the threshold in terms of absolute value.

The generator 2 has two MOS transistors 20 and 21 with channel zones of a same type, N or P. These transistors are conductive and form a current mirror. The transistor 20 is the output of the current generator: it is in series with the diode 1 which it supplies with current Is. The transistor 21 has a gate 212 and a drain 211 that are connected to each other. It is in series with a native MOS transistor 23. This transistor 23 and a MOS transistor 24 are conductive, with N or P channel zones of the same type, and form a current mirror. The gate 242 and the drain 241 of the transistor 24 are connected to each other.

Figure 3:
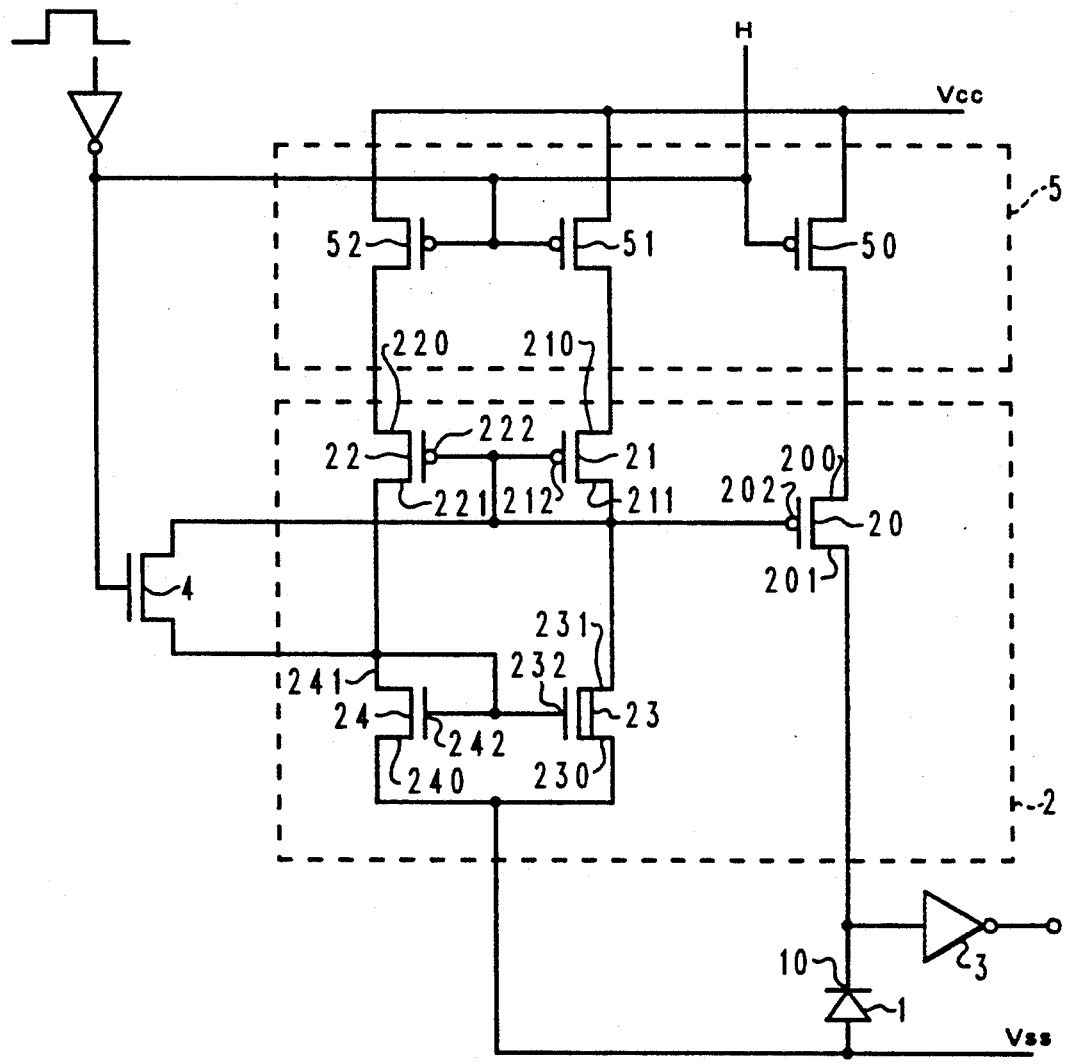
FIG. 3 is a electrical diagram of a temperature threshold detector according to the invention.

In a preferred example (FIG. 3), the transistors 20 and 21 have P type channel zones and the transistors 23 and 24 have N type channel zones, for an embodiment of the circuit in CMOS technology. The sources 200 and 210 of the transistors 20 and 21 are then connected to the positive supply voltage Vcc. The sources 230 and 240 of the transistors 23 and 24 are connected to the ground $V_{ss}$. The drains 211 and 231 of the transistors 21 and 23 are connected to each other. The drain 241 of the transistor 24 is connected to the supply voltage by resistor $R_L$. Finally, the drain 201 of the transistor 20 is connected to the cathode 10 of the diode 1. In FIG. 3, a transistor with a P type channel zone is identifiable through a small circle on its gate.

Other configurations are naturally possible: it is necessary to reverse the biases and the role of the source and drain zones to pass from a transistor with a channel zone of a given type to a transistor with a channel zone of an opposite type. All the rest of this description is given for a preferred configuration (FIG. 5).

The term "current mirror" is taken to mean the standard assembly of transistors with a channel zone of the same type, having their gates connected and their sources connected. The aim of an assembly such as this is to control a current in one or more arms of the mirror from the current of another arm. In the assembly described, the transistors 21 and 20 are a first arm and a second arm of the circuit. The currents in these two transistors are then equal or proportional, as a function of the ratio of the geometries W/L of these two transistors, W being the width and L the length of the channel zone of a MOS transistor. It is necessary, however, for these two transistors to have the same threshold voltage. It will be recalled that the threshold voltage of a MOS transistor is the gate/source voltage that must be applied to the transistor for it to start conducting.

In the current mirror formed by the transistors 20 and 21, it is the transistor 21 that controls the current in the other branch, namely the current Is of the transistor 20. Indeed, the transistor 21 is mounted as a diode, for its gate 212 and its drain 211 are connected to each other. It is conductive, for its source 210 is at Vcc and its drain 211 is indirectly connected to the ground. It is at the limit of conduction, i.e. with a gate-source voltage equal to its threshold voltage $V_T$. Indeed, let us take simply the transistor 21 with its source 210 connected to Vcc, its gate 212 and its drain 211 connected together as in FIG. 5. Let us place a resistor between its drain 211 and the ground $V_{ss}$. If the gate-source voltage of the transistor is great in relation to the threshold voltage, the transistor 21 is highly conductive. There is then a given voltage drop in the resistor, and the drain-source voltage will drop. Since gate and drain are connected, the gate-source voltage drops too. If the gate-source voltage is below the threshold voltage, the transistor is off; hence the drain-source voltage increases because then there is no voltage drop at the terminals of the resistor. The gate-source voltage therefore increases too, and the transistor becomes conductive. It is seen that a device such as this biases the transistor 21 at a constant gate-source voltage. This gate-source voltage is equal to the threshold voltage $V_T$ for a given resistance value. For this resistance value, the drop in voltage at the terminals of the resistor is $Vcc - V_T$.

In the assembly of FIG. 5, the load resistance is fulfilled by a transistor 23. The transistor 21 therefore conducts a current I that controls the current Is of the transistor 20.

The transistor 23 is biased to saturation at the constant gate-source voltage as shall be seen further below, by the transistor 24. The transistor 23 is also more resistive than the transistor 21 with an internal resistance value such that the transistor 21 is biased at the limit of conduction. The current flowing through the transistors 21 and 23 is then the saturation current of the transistor 23. Since the gate-source voltage of the transistor 23 is constant, the value of the internal resistance of the transistor 23 is constant and the saturation current is therefore constant. The current of each branch of the current mirror is therefore constant: the desired goal is achieved. There is a constant current generator.

In a preferred assembly, the transistors 20 and 21 are at threshold voltages that are as close as possible. The transistor 20 is then at the limit of conduction like the transistor 21, since the same gate-source voltage is applied to it. The current Is is then obtained from the current I of the transistor 21 by the ratio of the geometries W/L of the transistors 21 and 20.

Besides, it is known that the threshold voltage of a forward-biased MOS transistor increases in absolute value with the temperature, by about 2 mv/° C. It is known then that the current in the transistor diminishes; in particular, the current in the transistor 20 diminishes: the detection temperature will then get triggered for a temperature lower than the threshold temperature. This has no effect, for there will be only a slightly premature alarm. It is furthermore possible to project the variation of the current due to the variation of the threshold voltage with the temperature, to have the current Is desired at the threshold temperature.

The conditions of operation of the transistor 23 are explained hereinafter. The transistor 23 is a native transistor, i.e. with zero threshold voltage. A transistor such as this is shown according to one convention by a double bar between its source and its drain. The transistor 23 forms another current mirror with the transistor 24. In particular, one and the same gate-source voltage is applied to them.

The transistor 24 is conductive. It is mounted as a diode for its gate 242 and its drain 241 are interconnected. In the preferred assembly, the transistor 24 is one with an N type channel zone. Its source 240 is connected to the ground $V_{ss}$ and its drain 241 to the supply voltage Vcc, indirectly. If a load resistance $R_L$ with a sufficiently high value is placed between the supply voltage Vcc and the drain 241 of the transistor 24, said transistor is biased at a gate-source voltage equal to the threshold voltage $V_{T'}$ of the transistor 24. This is the same phenomenon already explained for the transistor 21.

Under these conditions, since the threshold voltage of a MOS transistor has a value intrinsic to the transistor, hence independent of the variations in supply voltage, the gate-source voltage of the transistor 24 remains constant even if the supply voltage Vcc varies. The transistor 23 is therefore controlled by a gate-source voltage, that of the transistor 24, which is constant and independent of the variations in supply voltage.

Furthermore, the threshold voltage has an absolute value of the order of one volt. The native transistor 23 is therefore highly conductive. It is shown that it is saturated for its drain-source voltage, which is equal to $Vcc - V_T$, is greater than its gate-source voltage which is equal to $V_{T'}$.

The current of the transistor 24 is controlled by the current, which is constant, of the transistor 23 since they form a current mirror.

FIG. 3 illustrates circuitry to bias the constant current transistor 24 more efficiently, where the above-described generator 2 is improved by using, instead of the load resistance $R_L$ with the transistor 24, a conductive MOS transistor 22 in series with the transistor 24. The transistor 22, forms a current mirror with the transistor 21: the transistor 21 controls the same current in the transistor 22 as does the transistor 23 in the transistor 24.

In the preferred embodiment, the transistor 22 has a P type channel zone. The transistors 24 and 22 are connected to each other by their drains 241 and 221. The source 220 of the transistor 22 is connected to the supply voltage Vcc.

When the voltage is turned on, a certain time is needed however for the transistors 21 and 24 to be biased at the limit of conduction. As long as this state is not reached, the output of the detector cannot be taken into account since there is no control over the current that supplies the diode. The time taken to reach this state of equilibrium may be too long. To overcome this drawback, the transistors 21 and 24 are made conductive as soon as the voltage is turned on. They will very swiftly go to their limit of conduction state.

This can be achieved by using an initialization device 4, comprising a MOS transistor 4, controlled at its gate by a pulse signal for putting the detection circuit into operation. The source and drain electrodes of the transistor 4 are connected, one to the gate of the transistor 21 and the other to the gate of the transistor 24. The pulse signal is said to be in an active state during a pulse. For an active state of the pulse signal, the transistor 4 is conductive. It is off for a non-active state. When it is conductive, its source and drain electrodes are short-circuited and bias the gates of the transistors 21 and 24 at a common positive potential between $V_{ss}$ and Vcc. The transistors 21 and 24 are then conductive and very soon reach the limit of conduction according to the process already described.

Furthermore, it is sought to limit the consumption of current in the circuit. To this end, a known device 5 for turning on the voltage is used. This device 5, analogous to a switch, is interposed between the supply voltage Vcc and the electrodes of the current generator normally connected to the supply voltage Vcc. In the preferred assembly, this device 5 for turning on the voltage is formed by three MOS transistors 50, 51, 52, all with channel zones of the same type, N or P, placed in series between the supply voltage Vcc and the sources respectively of the transistors 20, 21 and 22. These transistors 50, 51 and 52 are controlled at their gate by a pulse signal. The pulse signal is said to be in the active state during a pulse. During the active state of the pulse signal, the transistors are off (switch open). Otherwise they are conductive (switch closed). In this case, they then bring back the supply voltage to the source of each of the transistors 20, 21 and 22, thus putting the temperature detection circuit into operation.

This device 5 for turning on the voltage is improved by taking, as a pulse signal, the one that controls also the initialization device 4. Indeed, it is unnecessary to supply the diode and the current generator so long as the transistors 21 and 24 are not conductive. It is the type of the channel zones of the transistors in each device that determines the logic (positive or negative) to be used in each of the two devices, namely the initialization device 4 and the device 5 for turning on the voltage. In the example of FIG. 1, the transistors 50, 51 and 52 of the device 5 for turning on the voltage have P type channel zones: the pulse signal will therefore have, on one pulse, a level equal to Vcc and, otherwise, a level equal to $V_{ss}$, in the device 5 for turning on the voltage. Under these conditions, the initialization device 4 biases the gate of the transistors 21 and 24 at 0 volts, by capacitive coupling. As soon as Vcc is brought to the source of the transistor 21, it is conductive. The sources of the transistor 50, 51 and 52 are connected to the supply voltage and the drains to the sources of the transistors 20, 21 and 22 respectively. The transistor 4 of the initialization device is, in this very same example of FIG. 1, a transistor with an N type channel zone: the pulse of the pulse signal will therefore be taken in terms of positive logic in the initialization device 4. The source of the transistor 4 is connected to the gate of the transistor 21 and the drain to the gate of the transistor 24. By using a same logic of the pulse signal for the device 5 for turning on the voltage and the initialization device 4, a saving of one inverter is obtained. The pulse signal corresponds to an operation starting signal that comes, for example, from the detection of the threshold temperature: when the threshold temperature is detected, the circuit is put out of operation.

Figure 4:
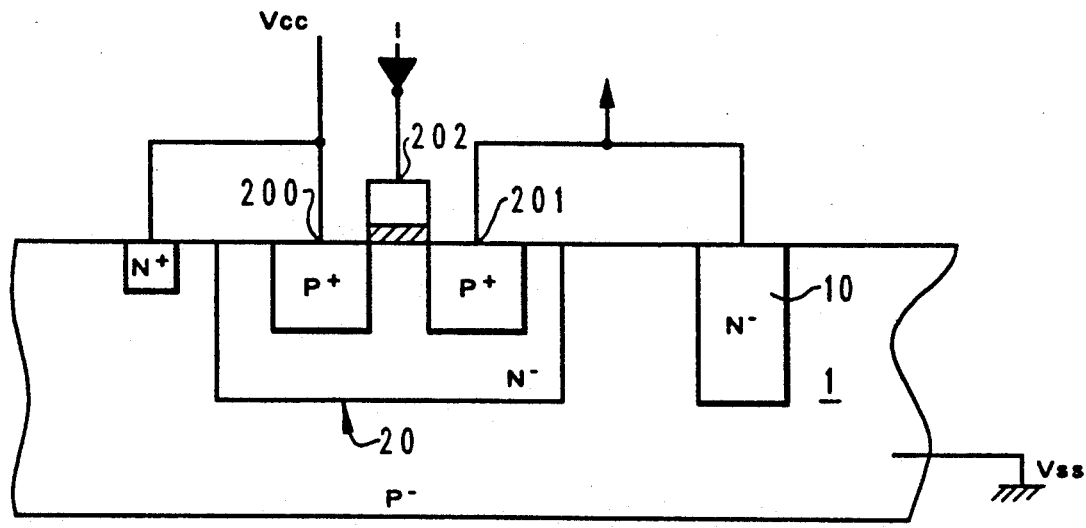
FIG. 4 is a schematic sectional view of the connection of a diode with the current generator according to FIG. 3, in a semiconductor substrate of an integrated circuit.

FIG. 4 is a sectional schematic view of an implantation of a reverse-biased diode 1, the cathode 10 (N zone) of which is connected to the drain 201 of a MOS transistor 20 with P type channel zone according to the example of FIG. 3. The gate 202, the drain 201 and the source 200 of the transistor 20 are distinguished therein. Preferably, all the components described are integrated into one and the same substrate as the integrated circuit that they are supposed to protect.

Furthermore, at a given temperature, which is below the threshold temperature, the circuit may be used to detect the presence of light or to detect a working frequency of this circuit that may be unduly low. This becomes necessary in order to prevent the effects of the acts of fraudulent individuals who might be tempted to remove the passivation layer from the integrated circuit (the circuit would then be exposed to an illumination which would reveal this fraud) or to attempt on/off manipulations at low frequency (which could thus modify the clock frequency of the circuit).

The principle of the circuit according to the invention is that of charging a reverse-biased diode with a given current I that is as stable as possible. Now, light has the effect of increasing the leakage current of the reverse-biased junctions by a factor of the order of about 1000.

If FIG. 3 is referred to, the transistor 20 that constitutes the generator of constant current is constituted with a ratio W/L such that it is sufficient to charge the diode in normal conditions. Should there be light present, the leakage current of the diode 1 increases and the transistor 20 is no longer sufficient to charge it. Hence, the voltage on the cathode of the diode falls and the circuit 3, or another comparator dedicated to this specific effect, detects the presence of light on the product.

The same detector circuit of FIG. 3 makes it possible to detect an unduly low operating frequency of an integrated circuit in which this detection circuit is mounted. In this case, it is possible to modify the role of the transistor 50. This transistor 50 had the role of limiting the current in the integrated circuit, in a low consumption mode. By connecting the gate of the transistor 50 to the clock signal of the integrated circuit, a frequency threshold detector can easily be obtained. Indeed, since the clock signal is a symmetrical square signal, it then periodically opens and closes the transistor 50. When the transistor 50 is conductive (gate at 0V), the reverse mounted diode is precharged. When the transistor 50 is non-conductive (gate at Vcc), the precharge is cut off. Thus, if the clock frequency is sufficiently fast, the potential on the cathode of the diode does not have the time to get discharged by the leakages of this diode, and the detection signal remains inactive. By contrast, if the clock frequency becomes lower than a certain threshold (depending on the diode and the charging current), this potential falls. The circuit then detects an unduly low frequency and the inverter 3 flips over. Dashed lines in FIG. 3 indicate a mode of application of the clock signal that could replace the initialization signal and a feature that provides the above-described economy of consumption.

We claim:

1. A detection circuit, comprising:
   an input for connection to a first voltage level;
   an output for connection to a second voltage level;
   a semiconductor diode for providing a detecting element, connected to the output at a first terminal;
   a current generator having an input node connected to the input and an output node connected to a second terminal of the semiconductor diode for supplying a constant current to reverse bias the semiconductor diode, the constant current being substantially independent of changes within a range in the voltage difference between the first and second voltage levels;
   the current generator comprising a current mirror formed by first and second MOS transistors with conductive channel zones of the same type, N or P, with the first MOS transistor supplying current to the output node of the current generator and its source or its drain, depending on whether it has a P type or N type channel zone, being connected to the second terminal of the semiconductor diode; and
   the output node connected to the second terminal of the semiconductor diode supplying a voltage signal for indicating the reverse conductivity of the semiconductor diode.

2. A current source relatively insensitive to power supply voltage level variation from a voltage source, comprising:
   a first mirror connected at an input to the voltage source for generating a constant current output matching a programming current, the first current mirror having first and second metal-oxide semiconductor (MOS) transistors with channel zones of one channel type, with the first MOS transistor supplying a constant current output;
   a second current mirror connected to a fixed voltage level as an input and connected to the first current mirror to supply the programming current the second current mirror having third and fourth MOS transistors of the opposite channel conductivity type as the first and second MOS transistors, the third MOS transistor being connected in series between the second MOS transistor and a node at the fixed voltage level, the third MOS transistor being biased into saturation at a constant gate voltage to fix a saturation current;
   an impedance connected between the voltage source and an input to the second current mirror;
   a load taking the constant current output as an input; and
   an output node connected to a terminal of the load for supplying a voltage signal indicating a voltage difference across the load.

3. The detection circuit according to claim 1, characterized in that the current generator comprises a third MOS transistor in series with the second MOS transistor, more resistive than the second MOS transistor and biased to saturation and with constant gate-source voltage to fix the current in the second MOS transistor.

4. The detection circuit according to claim 3, characterized in that the third MOS transistor is native and connected by its gate to the gate and to the drain of a fourth MOS transistor with a channel zone of a same type, N or P, for a saturation bias, and at a constant gate-source voltage of the third MOS transistor.

5. The detection circuit according to claim 4, characterized in that the current generator further comprises a fifth MOS transistor in series with the fourth MOS transistor with a channel zone of the same type as that of the second MOS transistor, the second and fifth MOS transistors forming a current mirror.

6. The detection circuit according to claim 5, characterized in that the current generator comprises an initialization device formed by a sixth MOS transistor, the source and drain electrodes of which are connected, one to the gate of the second MOS transistor and the other to the gate of the fourth MOS transistor, the sixth MOS transistor being controlled at its gate by a pulse signal such that the sixth MOS transistor is conductive on an active state of the pulse signal and off otherwise, to make the second and fourth MOS transistors conductive by biasing their gates.

7. The detection circuit according to claim 6, comprising a means for applying the first voltage level interposed between a supply voltage and the current generator characterized in that the means for applying are controlled by the pulse signal for controlling the initialization device so as not to consume current during the biasing of the gates of the second and fourth MOS transistors.

8. The detection circuit according to claim 5, characterized in that the second and fourth MOS transistors are operated at conduction limits.

9. The detection circuit according to claim 1, wherein the detecting element is a temperature detector utilizing the reverse conductivity of the semiconductor diode as an indicator of temperature.

10. The detection circuit according to claim 1, wherein the detecting element is a light detector utilizing the reverse conductivity of the semiconductor diode as an indicator of incident light.

11. The detection circuit according to claim 1, wherein the detect circuit is connected to a source of clock signal to operate as a frequency detector, the detection circuit further comprising, a switch connected in series between the first voltage level and the current generator, and the source of a clock signal to be monitored connected to control the switch.

12. The current source as set forth in claim 2, wherein the fourth MOS transistor connected at its gate and drain to the gate of the third MOS transistor and by the impedance to a node at the voltage source.

13. The current source as set forth in claim 12, wherein the impedance includes a fifth MOS transistor connected to the second MOS transistor to form a third current mirror.

14. The current source as set forth in claim 13, wherein the load is a semiconductor diode reversed biased by the constant current output to operate as a detecting element for temperature changes.

* * * * *